United States Patent
Lang et al.

(10) Patent No.: US 11,339,862 B2
(45) Date of Patent: May 24, 2022

(54) METHOD AND CONTROL UNIT FOR OPERATING A DRIVETRAIN OF A MOTOR VEHICLE COMPRISING A POWER TAKE-OFF

(71) Applicant: ZF Friedrichshafen AG, Friedrichshafen (DE)

(72) Inventors: Ulf Lang, Friedrichshafen (DE); Markus Eisele, Friedrichshafen (DE); Ralf Baus, Friedrichshafen (DE); Friedrich Reiter, Kressbronn am Bodensee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 21 days.

(21) Appl. No.: 17/076,347

(22) Filed: Oct. 21, 2020

(65) Prior Publication Data
US 2021/0116008 A1    Apr. 22, 2021

(30) Foreign Application Priority Data
Oct. 22, 2019  (DE) .................... 10 2019 216 212.6

(51) Int. Cl.
*F16H 45/02* (2006.01)
*F16H 61/14* (2006.01)

(52) U.S. Cl.
CPC ........... *F16H 45/02* (2013.01); *F16H 61/143* (2013.01); *F16H 2045/0294* (2013.01); *F16H 2061/145* (2013.01)

(58) Field of Classification Search
CPC ........ F16H 45/02; F16H 59/14; F16H 61/143; F16H 2061/145; F16H 2200/0004;
(Continued)

(56) References Cited

U.S. PATENT DOCUMENTS 5,674,155 A * 10/1997 Otto ...................... F16H 61/143
477/176
6,386,351 B1 * 5/2002 Salecker ............... F16H 61/143
192/54.1
(Continued)

FOREIGN PATENT DOCUMENTS

DE          195 04 935 A1     8/1985
DE     11 2008 000 312 T5     3/2010
(Continued)

OTHER PUBLICATIONS

German Search Report Corresponding to 10 2019 216 212.6 dated Apr. 17, 2020.
(Continued)

*Primary Examiner* — Richard W Ridley
*Assistant Examiner* — Aimee Tran Nguyen
(74) *Attorney, Agent, or Firm* — Finch & Maloney, PLLC; Michael Bujold; Jay Franklin

(57) ABSTRACT

A method for operating a drive-train of a motor vehicle. The drive-train having a transmission connected between a drive aggregate and a drive output. A hydrodynamic starting element is connected between the drive aggregate and transmission. The starting element includes a converter and converter lock-up clutch. A Power Take-Off (PTO) can be coupled to the drive aggregate on the drive aggregate side to take up drive torque delivered by the drive aggregate. In order to determine the torque taken up by the PTO, the lock-up clutch is operated in a rotational-speed-regulated manner at least when the PTO is coupled to the drive aggregate in order to set a defined target slip at the lock-up clutch. As a function of the actuation pressure of the lock-up clutch required for setting the target slip when the PTO is coupled, the torque taken up by the PTO is determined.

12 Claims, 1 Drawing Sheet

(58) Field of Classification Search
CPC ....... F16H 2059/147; F16H 2045/0294; B60K 17/28; B60K 25/02
See application file for complete search history.

(56) References Cited

U.S. PATENT DOCUMENTS

| | | |
|---|---|---|
| 8,540,606 B2 | 9/2013 | Livshiz et al. |
| 9,903,299 B2* | 2/2018 | Homant ................ F02D 41/083 |
| 2014/0026690 A1* | 1/2014 | Hairston ................ F16D 57/00 74/11 |
| 2017/0276242 A1* | 9/2017 | Matsubara .............. F16D 48/06 |
| 2019/0126737 A1* | 5/2019 | Lo ............................ B60K 6/26 |
| 2019/0126901 A1* | 5/2019 | Omran .................. B60W 10/02 |
| 2020/0231157 A1* | 7/2020 | Waibel ................. B60W 30/184 |
| 2021/0114456 A1* | 4/2021 | Lang ................... B60W 10/026 |

FOREIGN PATENT DOCUMENTS

| | | |
|---|---|---|
| DE | 10 2010 051 221 A1 | 6/2011 |
| DE | 10 2013 204 652 A1 | 9/2014 |
| DE | 10 2017 113 876 A1 | 12/2017 |
| WO | 2007/030070 A1 | 3/2007 |
| WO | 2014/139960 A1 | 9/2014 |

OTHER PUBLICATIONS

German Search Report Corresponding to 10 2019 216 211.8 dated Apr. 15, 2020.

* cited by examiner

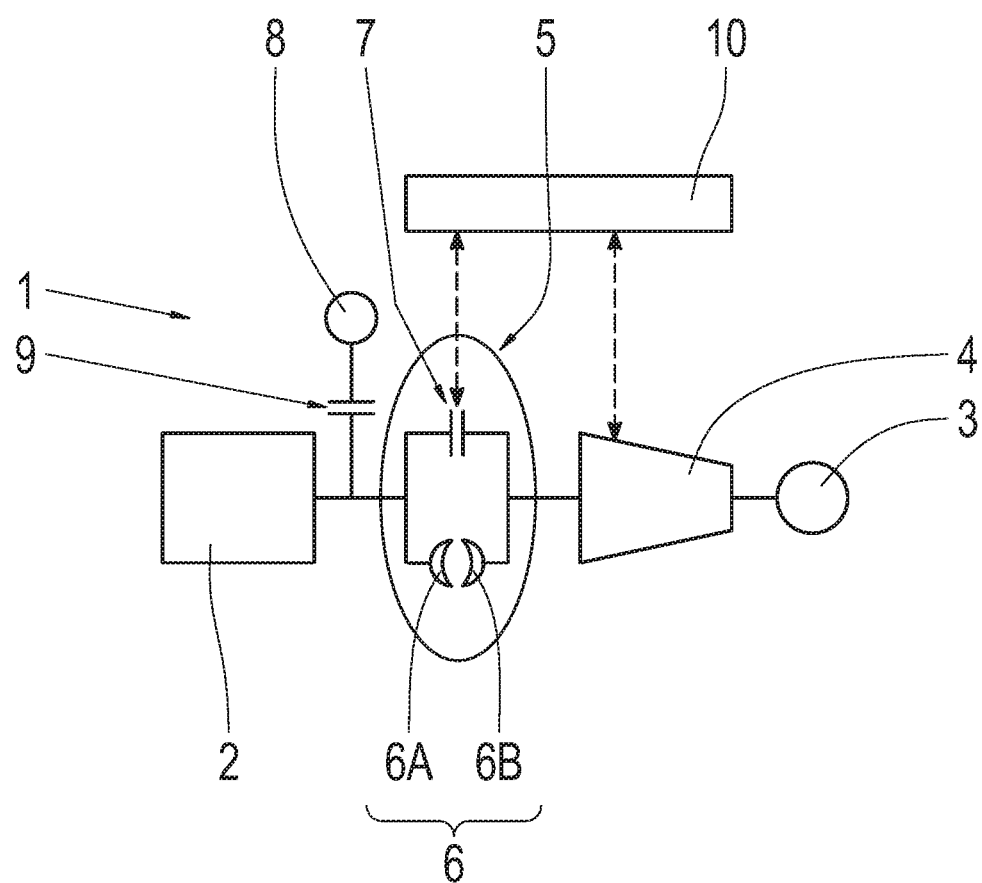

METHOD AND CONTROL UNIT FOR OPERATING A DRIVETRAIN OF A MOTOR VEHICLE COMPRISING A POWER TAKE-OFF

This application is claims priority from German patent application serial no. 10 2019 216 212.6 filed Oct. 22, 2019.

FIELD OF THE INVENTION

The invention relates to a method for operating a drive-train with a power take-off that can be coupled on the drive aggregate. In addition the invention relates to a control unit for operating a drive-train.

BACKGROUND OF THE INVENTION

A drive-train of a motor vehicle comprises a drive aggregate and a transmission connected between the drive aggregate and a drive output. The transmission is preferably an automatic or automated transmission, in which gearshifts are carried out automatically or in an automated manner. From practice it is known that between the drive aggregate and the transmission a hydrodynamic starting element can be connected, wherein such a hydrodynamic starting element comprises on the one hand a converter and on the other hand a converter lock-up clutch connected parallel to the converter.

Particularly in the case of utility vehicles the drive-train can comprise a power take-off, which can be coupled on the drive input aggregate side. When the power take-off is coupled it draws torque from the drive aggregate so that less torque is then available at the transmission and hence at the drive output. If shifts are to be carried out reliably in the transmission, then when the power take-off is coupled, it is important to know how much torque is taken up by the power take-off. Until now it has been difficult to determine in a simple and reliable manner the torque taken up by a power take-off that can be coupled on the drive aggregate side.

SUMMARY OF THE INVENTION

Starting from there, the purpose of the present invention is to provide a new type of method for operating a drive-train with a power take-off that can be coupled on the drive aggregate side, and a control unit for operating such a drive-train. That objective is achieved by a method for operating a drive-train according to the independent claim(s).

According to the invention, to determine a torque taken up by a power take-off the converter lock-up clutch is operated in a rotational-speed-regulated manner, in order to set at the converter lock-up clutch a defined target slip, and this indeed at least when the power take-off is coupled to the drive aggregate. As a function of the actuation pressure of the converter lock-up clutch required for setting the target slip when the power take-off is coupled, the torque taken up by the power take-off is determined.

With the invention it is proposed to operate the converter lock-up clutch in a rotational-speed-regulated manner, at least when the power take-off is coupled, and to determine that actuation pressure at the converter lock-up clutch which is required during rotational-speed-regulated operation in order to set the defined target slip at the converter lock-up clutch. As a function of this actuation pressure, the torque taken up by the power take-off can then be determined simply and reliably.

Preferably, a first torque at the converter lock-up clutch is determined as a function of the actuation pressure of the converter lock-up clutch needed for setting the target slip at the converter lock-up clutch when the power take-off is coupled. As a function of the actuation pressure of the converter lock-up clutch needed for setting the target slip at the converter lock-up clutch when the power take-off is decoupled, a second torque at the converter lock-up clutch is determined. The torque taken up by the power take-off is determined from the difference between the second torque at the converter lock-up clutch and the first torque at the converter lock-up clutch. This form of the invention is particularly preferred for determining the torque taken up by the power take-off.

Alternatively, the torque taken up by the power take-off can be determined from the difference between the motor torque delivered by the drive aggregate and the first torque.

Preferably, shifts in the transmission are carried out as a function of the torque taken up by the power take-off. In that way shifts can be carried out in the transmission accurately and with a high comfort level.

The control unit according to the invention is defined in the independent claim(s).

BRIEF DESCRIPTION OF THE DRAWINGS

Preferred further developments emerge from the subordinate claims and the description that follows. Example embodiments of the invention, to which it is not limited, will be explained with reference to the sole drawing.

The sole drawing schematically illustrates an example drive-train of a motor vehicle.

DETAILED DESCRIPTION OF THE PREFERRED EMBODIMENTS

In a very schematic manner the sole drawing shows a drive-train 1 of a motor vehicle, wherein the drive-train 1 comprises a drive aggregate 2 and a transmission 4 connected between the drive aggregate 2 and a drive output 3.

The transmission 4 is an automatic or automated change-speed transmission, in which gear changes and therefore shifts are carried out automatically or in an automated manner.

The drive-train 1 also comprises a hydrodynamic starting element 5 connected between the drive aggregate 2 and the transmission 4. The hydrodynamic starting element 5 comprises a converter 6 with a pump wheel 6A and a turbine wheel 6B. In addition the hydrodynamic starting element 5 has a converter lock-up clutch 7 which is connected parallel to the converter 6.

The drive-train 1 of the sole drawing also comprises a power take-off 8. Such a power take-off 8 is also denoted as a PTO (Power Take-Off). The power take-off 8 can be coupled by a clutch 9 to a shaft of the drive aggregate 2, in the sole drawing to the output shaft of the drive aggregate 2. Such a power take-off 8 is a power take-off 8 that can be coupled on the drive aggregate side.

When the clutch 9 is open the power take-off 8 is decoupled from the drive aggregate 2. On the other hand, when the clutch 9 is closed the power take-off 8 is coupled to the drive aggregate 2. When the power take-off 8 is coupled, the power take-off 8 takes up torque from the output shaft of the drive aggregate 2, so that less torque is then available at the transmission 4.

To determine the torque taken up by the power take-off 8, the converter lock-up clutch 7 is operated in a rotationalspeed-regulated manner, specifically with the help of a control unit 10. During the rotational-speed-regulated operation of the converter lock-up clutch 7, a defined target slip is set at the converter lock-up clutch 7, and in the context of the present invention this takes place with the power take-off 8 coupled and preferably also with the power take-off 8 decoupled.

In order to set the target slip at the converter lock-up clutch 7 when the power take-off 8 is coupled, a first actuation pressure is needed. In order to set the defined target slip when the power take-off 8 is decoupled from the drive aggregate 2, a second actuation pressure is needed at the converter lock-up clutch. As a function of these actuation pressures the torque taken up by the power take-off 8 can be determined.

As a function of the actuation pressure of the converter lock-up clutch 7 required for setting the target slip at the converter lock-up clutch 7 when the power take-off 8 is coupled, a first moment or torque at the converter lock-up clutch 7 is determined, preferably from the following equation:

$$M_1 = p_1 * A * \mu * r$$

in which $M_1$ is the first torque, $p_1$ is the actuation pressure of the converter lock-up clutch when the power take-off is coupled, A is the friction surface area of the converter lock-up clutch, $\mu$ is the coefficient of friction of the converter lock-up clutch and r is the frictional radius of the converter lock-up clutch.

As a function of the actuation pressure of the converter lock-up clutch 7 required for setting the target slip at the converter lock-up clutch 7 when the power take-off 8 is decoupled, a second moment at the converter lock-up clutch 7 is determined, preferably from the following equation:

$$M_2 = p_2 * A * \mu * r$$

in which $M_2$ is the second torque, $p_2$ is the actuation pressure of the converter lock-up clutch when the power take-off is decoupled, A is the friction surface area of the converter lock-up clutch, $\mu$ is the coefficient of friction of the converter lock-up clutch 7 and r is the frictional radius of the converter lock-up clutch 7.

As a function of these two torques, the torque taken up by the power take-off 8 can be determined, namely from the difference between the second torque at the converter lock-up clutch 7 when the power take-off is decoupled from the drive aggregate 2 and the first torque at the converter lock-up clutch 7 when the power take-off 8 is coupled to the drive aggregate 2.

The value of the torque taken up by the power take-off 8, determined in this way, is preferably stored in the control unit 10 so that thereafter the control unit 10 can carry out shifts in the transmission 4 taking into account the torque taken up by the power take-off 8, namely when, while carrying out shifts, the power take-off 8 is coupled to the drive aggregate 2 by closing the clutch 9.

It is also possible to compare the first torque at the converter lock-up clutch 7 determined while the power take-off 8 is coupled to the drive aggregate 2, with the torque delivered by the drive aggregate 2.

The torque taken up by the power take-off 8 can also be determined from the difference between the moment or torque delivered by the drive aggregate and the first moment or torque required during rotational speed-regulated operation of the converter lock-up clutch 7 for setting the target slip while the power take-off 8 is coupled. The motor torque delivered by the drive aggregate 2 can be transmitted to the control unit 10 from a motor control unit by way of a CAN data bus.

The invention further relates to a control unit 10 designed to carry out the method according to the invention. The control unit 10 operates the converter lock-up clutch 7 in a rotational-speed-regulated manner and determines an actuation pressure of the converter lock-up clutch 7, which during the rotational-speed-regulated operation, is required in order to set the defined target slip at the converter lock-up clutch 7. This takes place at least with the power take-off 8 coupled to the drive aggregate 2 and preferably also while the power take-off 8 is decoupled from the drive aggregate 2. When this is done with the power take-off both coupled and decoupled, the control unit 10 can determine the torque taken up by the power take-off 8 from the corresponding actuation pressures and, as a function of those actuation pressures, by calculating a difference between them. The motor torque delivered by the drive aggregate 2 can also be transmitted to the control unit 10 by some other control unit, in order to calculate the torque taken up by the power take-off 8 by computing a difference between the motor torque and the torque at the converter lock-up clutch 7 which is determined when the power take-off 8 is coupled to the drive aggregate 2.

The control unit 10 is preferably the transmission control unit. This has means for carrying out the method according to the invention. The means include hardware-side means and software-side means.

The hardware-side means are data interfaces for exchanging data with the assemblies involved in carrying out the method according to the invention, i.e. at least with the converter lock-up clutch 7.

In addition the hardware-side means include a memory for data storage and a processor for data processing.

The software means consist of program modules which are implemented in the control unit 10 for carrying out the method according to the invention.

INDEXES

1 Drive-train
2 Drive aggregate
3 Drive output
4 Transmission
5 Starting element
6 Converter
6A Pump wheel
6B Turbine wheel
7 Converter lock-up clutch
8 Power take-off
9 Clutch
10 Control unit

The invention claimed is:

1. A method for operating a drive-train of a motor vehicle, the drive-train having a drive aggregate, a transmission connected between the drive aggregate and a drive output, a hydrodynamic starting element connected between the drive aggregate and the transmission, and the hydrodynamic starting element having a converter and a converter lock-up clutch connected parallel to the converter, the drive-train further having a power take-off that is couplable on a drive aggregate side to the drive aggregate, in order to take up drive torque delivered by the drive aggregate, the method comprising:

to determine a torque taken up by the power take-off,
    operating the converter lock-up clutch in a rotationalspeed-regulated manner at least when the power take-off is coupled to the drive aggregate, in order to set a defined target slip at the converter lock-up clutch, and determining the torque taken up by the power take-off as a function of an actuation pressure of the converter lock-up clutch required for setting the target slip while the power take-off is coupled.

2. The method according to claim 1, further comprising operating the converter lock-up clutch in the rotational-speed-regulated manner both with the power take-off coupled and with the power take-off decoupled, determining the torque taken up by the power take-off as a function of the actuation pressure of the converter lock-up clutch required for setting the target slip when the power take-off is coupled, and as a function of the actuation pressure of the converter lock-up clutch required for setting the target slip when the power take-off is decoupled.

3. The method according to claim 1, further comprising determining a first torque at the converter lock-up clutch as a function of the actuation pressure of the converter lock-up clutch required for setting the target slip at the converter lock-up clutch when the power take-off is coupled.

4. The method according to claim 3, further comprising calculating the first torque, at the converter lock-up clutch, from the following equation:

$$M_1 = p_1 * A * \mu * r$$

in which $M_1$ is the first torque,
  $p_1$ is the actuation pressure of the converter lock-up clutch when the power take-off is coupled,
  A is the friction surface area of the converter lock-up clutch,
  $\mu$ is the coefficient of friction of the converter lock-up clutch, and
  r is the friction radius of the converter lock-up clutch.

5. The method according to claim 3, further comprising determining the torque taken up by the power take-off from a difference between a second torque and the first torque, and the second torque at the converter lock-up clutch being determined as a function of the actuation pressure of the converter lock-up clutch required for setting the target slip at the converter lock-up clutch when the power take-off is decoupled.

6. The method according to claim 3 further comprising determining the torque taken up by the power take-off from the difference between a torque delivered by the drive aggregate and the first torque.

7. The method according to claim 1, further comprising determining a second torque at the converter lock-up clutch as a function of the actuation pressure of the converter lock-up clutch required for setting the target slip at the converter lock-up clutch when the power take-off is decoupled.

8. The method according to claim 7, further comprising calculating the second torque at the converter lock-up clutch from the following equation:

$$M_2 = p_2 * A * \mu * r$$

in which $M_2$ is the second torque,
  $p_2$ is the actuation pressure of the converter lock-up clutch when the power take-off is decoupled,
  A is the friction surface area of the converter lock-up clutch,
  $\mu$ is the coefficient of friction of the converter lock-up clutch, and
  r is the friction radius of the converter lock-up clutch.

9. The method according to claim 1, further comprising carrying out shifts in the transmission as a function of the torque taken up by the power take-off.

10. A control unit for operating a drive-train of a motor vehicle, the control unit operating a converter lock-up clutch of the drive-train in a rotational-speed-regulated manner in order to determine a torque taken up by a power take-off, in order to set a defined target slip at the converter lock-up clutch, the drive-train having a drive aggregate, a drive output and a transmission connected between the drive aggregate and the drive output, and a clutch, for engaging the power take-off, is located between the drive aggregate and the converter lock-up clutch, wherein, as a function of an actuation pressure of the converter lock-up clutch required for setting the defined target slip when the power take-off is coupled, the control unit determines the torque taken up by the power take-off.

11. The control unit according to claim 10, wherein the control unit is designed to carry out a method for operating the drive-train, the drive-train having a hydrodynamic starting element connected between the drive aggregate and the transmission, and the hydrodynamic starting element having a converter and a converter lock-up clutch connected parallel to the converter, the drive-train further having the power take-off that is couplable on a drive aggregate side to the drive aggregate, in order to take up drive torque delivered by the drive aggregate, wherein to determine the torque taken up by the power take-off, operating the converter lock-up clutch in a rotational-speed-regulated manner at least when the power take-off is coupled to the drive aggregate, in order to set the defined target slip at the converter lock-up clutch, and determining the torque taken up by the power take-off as a function of the actuation pressure of the converter lock-up clutch required for setting the defined target slip while the power take-off is coupled.

12. A method for operating a motor vehicle drive-train having a drive aggregate, a transmission connected between the drive aggregate and a drive output, a hydrodynamic starting element connected between the drive aggregate and the transmission, the hydrodynamic starting element having a converter and a converter lock-up clutch connected parallel to the converter, and the drive train further having a power take-off that is couplable, on a drive aggregate side thereof, to the drive aggregate in order to take up drive torque delivered by the drive aggregate, the method comprising:

operating the converter lock-up clutch in a rotational-speed-regulated manner at least when the power take-off is coupled to the drive aggregate, determining torque taken up by the power take-off as a function of an actuation pressure of the converter lock-up clutch while the power take-off is coupled to the drive aggregate, and setting a defined target slip at the converter lock-up clutch based on the torque taken up by the power take-off while the power take-off is coupled to the drive aggregate.

* * * * *